United States Patent [19]

Mennemeier et al.

[11] Patent Number: 6,018,351

[45] Date of Patent: Jan. 25, 2000

[54] COMPUTER SYSTEM PERFORMING A TWO-DIMENSIONAL ROTATION OF PACKED DATA REPRESENTING MULTIMEDIA INFORMATION

[75] Inventors: Larry M. Mennemeier, Boulder Creek, Calif.; Alexander D. Peleg, Haifa, Israel; Carole Dulong, Saratoga, Calif.; Eiichi Kowashi, Ryugasaki, Japan; Millind Mittal, Mendham, N.J.; Benny Eitan, Haifa, Israel

[73] Assignee: Intel Corporation, Santa Clara, Calif.

[21] Appl. No.: 08/961,549

[22] Filed: Oct. 30, 1997

Related U.S. Application Data

[63] Continuation of application No. 08/574,932, Dec. 19, 1995, abandoned.

[51] Int. Cl.⁷ .................................................. G06F 15/00
[52] U.S. Cl. ................................................................ 345/437
[58] Field of Search ........................................ 345/437, 436, 345/435, 121, 118, 123; 708/520–524

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 3,959,582 | 5/1976 | Law et al. | 178/6.8 |
| 4,146,925 | 3/1979 | Green et al. | 364/521 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |

(List continued on next page.)

OTHER PUBLICATIONS

J. Shipnes, Graphics Processings with the 88110 RISC Microprocessor, IEEE (1992), pp. 169–174.

MC88110 Second Generation RISC Microprocessor User's Manual, Motorola Inc. (1991).

Errata to MC88110 Second Generation RISC Microprocessor User's Manual, Motorola Inc. (1992), pp. 1–11.

MC88110 Programmer's Reference Guide, Motorola Inc. (1992), p 1–4.

i860™ Microprocessor Family Programmer's Reference Manual, Intel Corporation (1992), Ch. 1, 3, 8, 12.

(List continued on next page.)

Primary Examiner—Phu K. Nguyen
Attorney, Agent, or Firm—Blakely, Sokoloff, Taylor & Zafman

[57] ABSTRACT

A computer system for processing multimedia data, wherein the data is transformed from a first domain to a second domain by performing two dimensional rotation on the data. The computer system includes a memory having stored therein a set of packed data sequences having data elements representing the digital data, and a sequence of instructions for transforming the digital data from a first domain to a second domain. The instructions, when executed, cause the processor to generate a first set of intermediate results in response to the execution of a first instruction which multiples data elements of a first packed data sequence with corresponding elements of a third packed data sequence, wherein the data elements of the third packed data sequence represent either a sine or cosine function. The instructions then cause the processor to generate a second set of intermediate results in response to the execution of a second instruction which multiplies the data elements of a second packed data sequence with corresponding data elements of a fourth packed data sequence, wherein the data elements of the fourth packed data sequence representing either a sine or cosine function. A set of first set of final results is generated in response to the execution of a third instruction which performs an arithmetic operation between corresponding data elements of the first and second sets of intermediate results. The final results represent the digital data transformed into the second domain.

30 Claims, 8 Drawing Sheets

U.S. PATENT DOCUMENTS

| | | | |
|---|---|---|---|
| 4,754,269 | 6/1988 | Kishi et al. | 340/729 |
| 4,771,379 | 9/1988 | Ando et al. | 364/200 |
| 4,989,168 | 1/1991 | Kuroda et al. | 364/715.09 |
| 5,095,457 | 3/1992 | Jeong | 364/758 |
| 5,187,679 | 2/1993 | Vassiliadis | 364/786 |
| 5,473,557 | 12/1995 | Harrison et al. | 708/520 |
| 5,493,521 | 2/1996 | Oota | 708/520 |
| 5,568,600 | 10/1996 | Kaba | 395/137 |
| 5,594,679 | 1/1997 | Iwata | 708/524 |

OTHER PUBLICATIONS

R. B. Lee, Accelerating Multimedia With Enhanced Microprocessors, IEEE Micro (Apr. 1995), pp. 22–32.

*TMS320C2x User's Guide*, Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, New PA–RISC Processor Decodes MPEG Video, Microprocessor Report (Jan. 1994), pp. 16, 17.

SPARC Technology Business, UltraSPARC Multimedia Capabilities On–Chip Support for Real–Time Video and Advanced Graphics, Sun Microsystems (Sep. 1994).

Y. Kawakami et al., LSI Applications: A Single–Chip Digital Signal Processor for Voiceband Applications, Solid State Circuits Conference, Digest of Technical Papers; IEEE International (1980).

B. Case, Philips Hopes to Displace DSPs with VLIW, Microprocessor Report (Dec. 94), pp. 12–18.

N. Margulis, *i860 Microprocessor Architecture* McGraw Hill, Inc. (1990) Ch. 6, 7, 8, 10, 11.

*Pentium Processor User's Manual, Volume 3: Architecture and Programming Manual*, Intel Corporation (1993), Ch. 1, 3, 4, 6, 8, and 18.

| $X_1$ 702a | $X_2$ 702b | $X_3$ 702c | $X_4$ 702d | 702 |
|---|---|---|---|---|
| $\cos\theta \cdot C$ 704a | $\cos\theta \cdot C$ 704b | $\cos\theta \cdot C$ 704c | $\cos\theta \cdot C$ 704d | 704 |
| $X_1 \cdot (\cos\theta \cdot C)$ 706a | $X_2 \cdot (\cos\theta \cdot C)$ 706b | $X_3 \cdot (\cos\theta \cdot C)$ 706c | $X_4 \cdot (\cos\theta \cdot C)$ 706d | 706 |
| $Y_1$ 708a | $Y_2$ 708b | $Y_3$ 708c | $Y_4$ 708d | 708 |
| $\sin\theta \cdot C$ 710a | $\sin\theta \cdot C$ 710b | $\sin\theta \cdot C$ 710c | $\sin\theta \cdot C$ 710d | 710 |
| $Y_1 \cdot (\sin\theta \cdot C)$ 712a | $Y_2 \cdot (\sin\theta \cdot C)$ 712b | $Y_3 \cdot (\sin\theta \cdot C)$ 712c | $Y_4 \cdot (\sin\theta \cdot C)$ 712d | 712 |
| $(X_1 \cdot (\cos\theta \cdot C)) - (Y_1 (\sin\theta \cdot C))$ 714a | $(X_1 \cdot (\cos\theta \cdot C)) - (Y_1 (\sin\theta \cdot C))$ 714b | $(X_1 \cdot (\cos\theta \cdot C)) - (Y_1 (\sin\theta \cdot C))$ 714c | $(X_1 \cdot (\cos\theta \cdot C)) - (Y_1 (\sin\theta \cdot C))$ 714d | 714 |
| $X'_1$ 716a | $X'_2$ 716a | $X'_3$ 716a | $X'_4$ 716a | 716 |

FIG. 7

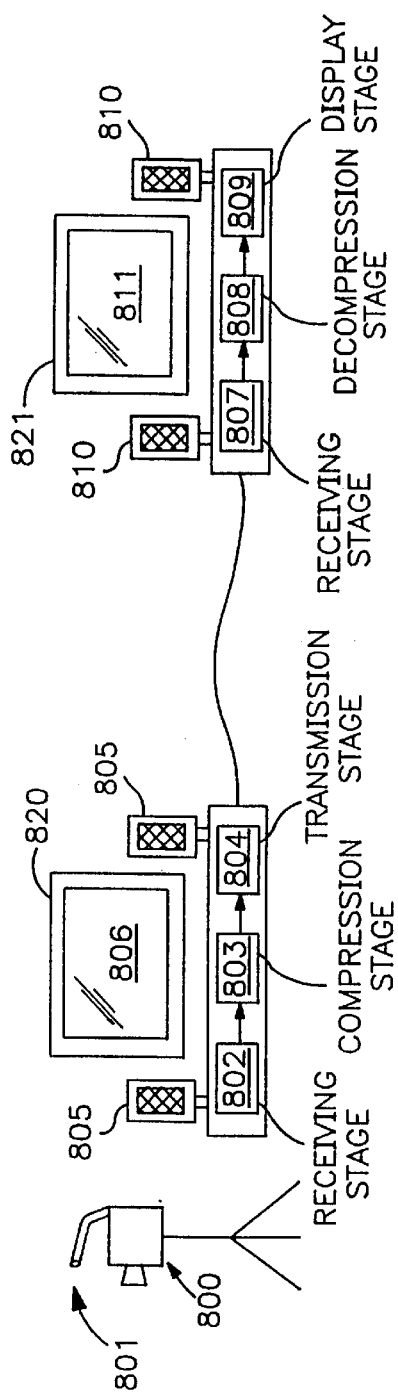
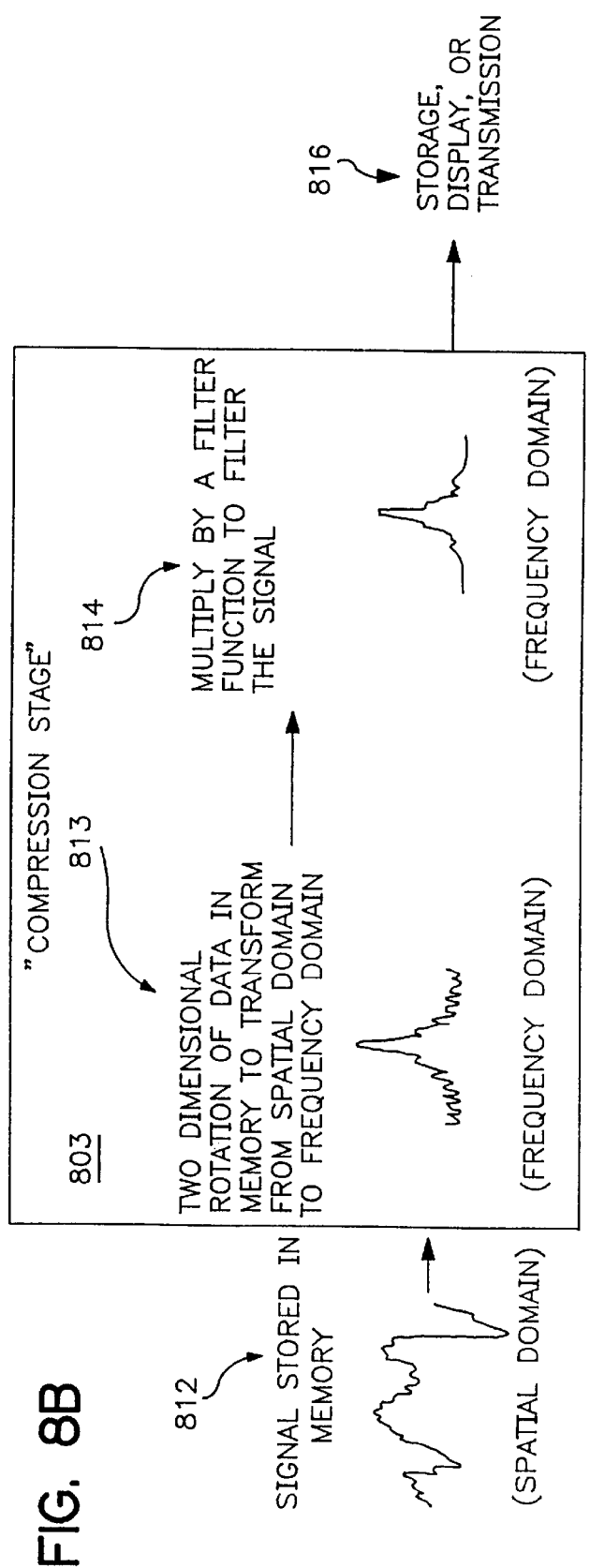
FIG. 8A
FIG. 8B

COMPUTER SYSTEM PERFORMING A TWO-DIMENSIONAL ROTATION OF PACKED DATA REPRESENTING MULTIMEDIA INFORMATION

CROSS-REFERENCE TO RELATED APPLICATIONS

This is a continuation of application Ser. No. 08/574,932, filed Dec. 19, 1995, now abandoned.

The following co-pending patent Application is related:

U.S. patent application entitled: COMPUTER IMPLEMENTED METHOD FOR PROVIDING A TWO DIMENSIONAL ROTATION OF PACKED DATA, invented by Larry M. Mennemeier, Alexander D. Peleg, Carole Dulong, Eiichi Kowashi, Millind Mittal, and Benny Eitan, with Ser. No. 08/573,531, and filed on Dec. 15, 1995.

BACKGROUND OF THE INVENTION

1. Field of the Invention

The invention relates to computers and more specifically to the processing of multimedia data parameters.

2. Description of Related Art

Computer multimedia applications typically involve the processing of high volumes of small data values representing audio signals and video images. Many times processing the data includes performing transform coding which is a method of converting the data values into a series of transform coefficients for more efficient transmission, computation, encoding, compression, or other processing algorithms.

More specifically, the data values often represent a signal as a function, for example, of time. The transform coefficients represent the same signal as a function, for example, of frequency. There are numerous transform algorithms, including, for example, the fast fourier transform (FFT), the discrete cosine transform (DCT), and the Z transform. Corresponding inverse transform algorithms, such as an inverse DCT, convert transform coefficients to sample data values. Many of these algorithms include multiple mathematical steps. A DCT, for example, includes a step identical to a two-dimensional rotation of the data values.

The steps of the rotation involve assuming two separate data values represent X and Y positions, respectively, on a two-dimensional graph. The two-dimensional rotation is performed by modifying the values to represent new positions on the X and Y axis.

The equations typically used by the DCT to rotate the positions are illustrated in table one below. In the equations, the coefficient C represents a scaling factor to determine a distance of the movement.

TABLE 1

$X' = C \cdot ((Cos\theta \cdot X) -/+ (Sin\theta \cdot Y))$
$Y' = C \cdot ((Sin\theta \cdot X) -/+ (Cos\theta \cdot Y))$ A prior method implementing the above equations by computing the two-dimensional rotation of the data values on conventional computers, involves the slow and inefficient method of using at least three instructions to generate one resulting value representing a modified X or Y component. For example, one or more instructions are used to generate the product of a first data value and a cosine or sine function, the same for a second product, and a third instruction to generate the sum or difference of the first and second product.

However, recent advancements in more modern computers provide a system that is able to process the small data values more efficiently. More specifically, multiple data elements are joined together as packed data sequences. The packed data sequences enable the transfer of up to sixty-four bits of integer data. As a result, in addition to the conventional thirty-two bit integer register file, a multimedia (M) register file is provided to take advantage of the packed data sequences. The MM register file typically has extended registers providing storage for sixty-four data bits.

With the availability of the packed data and the MM registers, a second method is available to generate the two-dimensional rotation of the data values. The second method, however, uses additional instruction per final result to generating a more accurate result. For example, as previously stated, the DCT is typically used to encode the data values possibly representing pixels of a video image. Thereafter, the encoded data is processed to regenerate the original image. However, when regenerating an image that is not frequently refreshed (i.e., stationary images), there is a higher demand placed on the accuracy of regenerating the image. In such cases, cumulative errors are very noticeable. On the other hand, when regenerating an image for motion video, such as MPEG, the referenced image is typically refreshed more frequently. Therefore, the accumulated errors in the encoded pixel data are not as noticeable, and as a result, there is not as great of a need for accuracy, thereby allowing more effort to be place on increasing the speed of processing the data.

Even though the second method was developed to provide greater accuracy, it is nevertheless discussed below to provide a background for further illustrating the need for a faster method of generating the two-dimensional rotation of packed data, and therefore the advantages and novelty of the method of the present invention.

As illustrated in Table 2 below, the second method, using packed data, typically involves using at least four to five instructions to generate two resulting values. More specifically, a first instruction assumes two adjacent data values in memory represent X and Y components, respectively. The two data values are loaded into a first register in the non-planar format as packed words, each filling a sixteen bit element of the four sixteen bit elements available in the MM register. (Table 2a). A second instruction copies the data to take advantage of the unused data space in the register. (Table 2b). A third instruction performs two micro-operations. In the third instruction, a second packed data is provided as a memory operand containing either sine or cosine functions (Table 2c). The elements of the first packed data are multiplied with the corresponding elements of the packed data memory operand, thereby providing a set of intermediate results in packed data (Table 2d). Next, in the set of intermediate results packed data, adjacent elements are added. (Table 2e). As a result, two resultant values are provided in thirty-two bit formats, which is a larger format than desired for subsequent processing steps in typical transform algorithms. Thus, a fourth instruction is used to perform a right addition shift to truncate the resulting values to sixteen bit values. (Table 2e). Next, a fifth instruction can be used to copy the data values into the adjacent positions so as to be re-stored in memory as the modified X and Y components representing the two-dimensional rotation. (Table 2f).

TABLE 2

| X | Y | X | Y | a |
|---|---|---|---|---|
| X | Y | X | Y | b |
| C · Cos | C · Sin | C · Cos | C · Sin | c |
| X · C · Cos | X · C · Cos | X · C · Cos | X · C · Cos | d |
| (X · (C · Cos)) + (Y · (C · Sin)) | | (X · (C · Cos)) + (Y · (C · Sin)) | | e |
| >>16 | X' | >>16 | Y' | f |
| | | X' | Y' | g |

The second method, however, inefficiently includes instructions that duplicate the data, truncate and normalize the resultant data into the desired lengths, and furthermore, copy the data values back into the original adjacent positions. These extra instructions are costly time consuming instructions that impede the optimum processing speed of generating the two-dimensional rotation of the data by using four to five instructions to generate only two results.

Therefore, what is needed is a faster and more efficient computer system that is able to generate a greater number of resulting values representing the two-dimensional rotation of the data values through the use of fewer instructions, so as to process digital data representing multimedia information for encoding, compression, or other related multimedia processing techniques.

SUMMARY OF THE INVENTION

A computer system for processing multimedia data, wherein the data is transformed from a first domain to a second domain by performing two dimensional rotation on the data. The computer system includes a processor, a multimedia input device receiving an analog signal representing an image or audio input, and a digitizing unit coupled to the multimedia input device. The digitizing unit generates digital data representing to the input. The computer system further includes a memory coupled to the digitizing unit and the processor. The memory has stored therein a set of packed data sequences having data elements representing the digital data, and a sequence of instructions for transforming the digital data from a first domain to a second domain. When the instructions are executed by the processor, the instructions cause the processor to perform a two-dimensional rotation on the digital data. Specifically, the instructions cause the processor to generate a first set of intermediate results in response to the execution of a first instruction which multiples data elements of a first packed data sequence with corresponding elements of a third packed data sequence, wherein the data elements of the third packed data sequence represent either a sine or cosine function. The instructions then cause the processor to generate a second set of intermediate results in response to the execution of a second instruction which multiplies the data elements of a second packed data sequence with corresponding data elements of a fourth packed data sequence, wherein the data elements of the fourth packed data sequence representing either a sine or cosine function. A set of first set of final results is generated in response to the execution of a third instruction which performs an arithmetic operation between corresponding data elements of the first and second sets of intermediate results. The final results represent the digital data transformed into the second domain.

BRIEF DESCRIPTION OF THE DRAWINGS

FIG. 7 illustrates the packed data operations used in the method of the present invention.

FIGS. 8a and 8b illustrate an application of the two-dimensional rotation in a computer system in accordance with one embodiment of the present invention.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Computer System of the Invention

Figure 1:
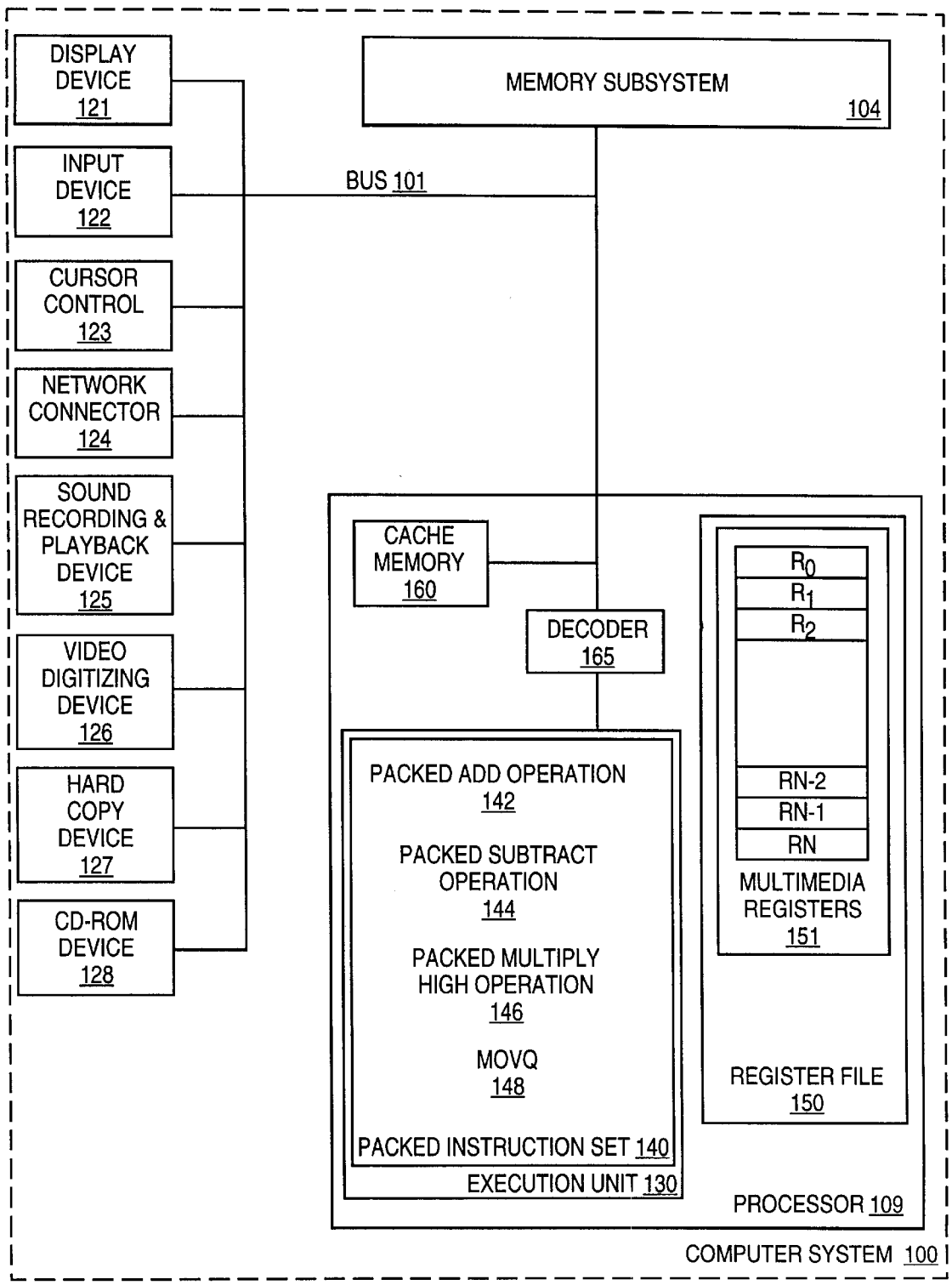
FIG. 1 illustrates a computer system in accordance with one embodiment of the invention.

FIG. 1 shows a computer system 100 in accordance with one embodiment of the invention. Computer system 100 comprises a bus 101 for communicating information, processor 109 coupled to bus 101 for processing information, and memory subsystem 104 coupled to bus 101 for storing information and instructions for processor 109.

Processor 109 includes an execution unit 130, a register file 150, a cache memory 160, a decoder 165, and an internal bus 170. Cache memory 160, storing frequently and/or recently used information for processor 109, is coupled to execution unit 130. Register file 150 stores information in processor 109 and is coupled to execution unit 130 via internal bus 170. In one embodiment of the invention, register file 150 includes multimedia registers 151 for storing multimedia information. In one embodiment, multimedia registers 151 each store up to sixty-four bits of packed data. Multimedia registers 151 may be dedicated multimedia registers or registers which are used for storing multimedia information and other information. In one embodiment, multimedia registers 151 store multimedia data when performing multimedia operations and store floating point data when performing floating point operations.

Execution unit 130 operates on packed data according to the instructions received by processor 109 that are included in packed instruction set 140. Execution unit 130 also operates on scalar data according to instructions implemented in general-purpose processors. In one embodiment of the invention, processor 109 supports the Pentium® microprocessor instruction set and the packed instruction set 140. By including packed instruction set 140 into a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER, and MOTOROLA Alpha™ is a trademark of Digital Equipment Corporation.)

In one embodiment of the invention, packed instruction set 140 includes instructions for executing a Packed Multiply High 146, a Packed Addition 142, a Packed Subtraction operation 144, and a MOVQ operation 148.

By including packed instruction set 140 in the instruction set of general-purpose processor 109 along with associated circuitry to execute the instructions, the operations used by many existing multimedia applications may be performed using packed data in a general-purpose processor. Thus, many multimedia applications may be executed more efficiently by using the full width of a processor's data bus for performing operations on packed data. This eliminates the need to transfer smaller units of data across the processor's data bus to perform one or more operations one data element at a time.

Still referring to FIG. 1, the computer system 100 of the invention includes a display device 121 such as a monitor. The display device 121 may include an intermediate device such as a frame buffer. The computer system 100 includes an input device 122 such as a keyboard, and a cursor control 123 such as a mouse, or trackball, or trackpad. The display device 121, the input device 122, and the cursor control 123 are coupled to bus 101. Computer system 100 may also include a network connector 124 such that computer system 100 is part of a local area network (LAN) or a wide area network (WAN). Additionally, computer system 100 can be coupled to a device for sound recording, and/or playback 125, such as an audio digitizer coupled to a microphone for recording voice input for speech recognition. Computer system 100 may also include a video digitizing device 126 that can be used to capture video images, a hard copy device 127 such as a printer, and a CD-ROM device 128. The devices 124–128 are also coupled to bus 101.

Packed Data Formats of the Invention

In one embodiment of the invention, the execution unit 130 operates on data in several different packed data formats. For example, in one embodiment, the computer system 100 manipulates sixty-four-bit data groups. In this embodiment, packed data can be in one of three formats: a packed byte format, a packed word format, or a packed double-word (dword) format. Packed data in a packed byte format includes eight separate 8-bit data elements. Packed data in a packed word format includes four separate 16-bit data elements and packed data in a packed dword format includes two separate 32-bit data elements. Examples of particular operations are discussed below with reference to packed word format. However, the operations apply similarly to any of the packed data formats of the invention.

Additionally, many of the instructions of packed instruction set 140 can operate on signed or unsigned data and can be performed with or without "saturation". If an operation is performed using saturation, the value of the data element is clamped to a predetermined maximum or minimum value when the result of the operation exceeds the range of the data element. Exceeding the range of the data element is also referred to as data overflow or underflow. The use of saturation avoids the effects of data overflow or underflow.

Packed Data Instructions of the Invention

Figure 2:
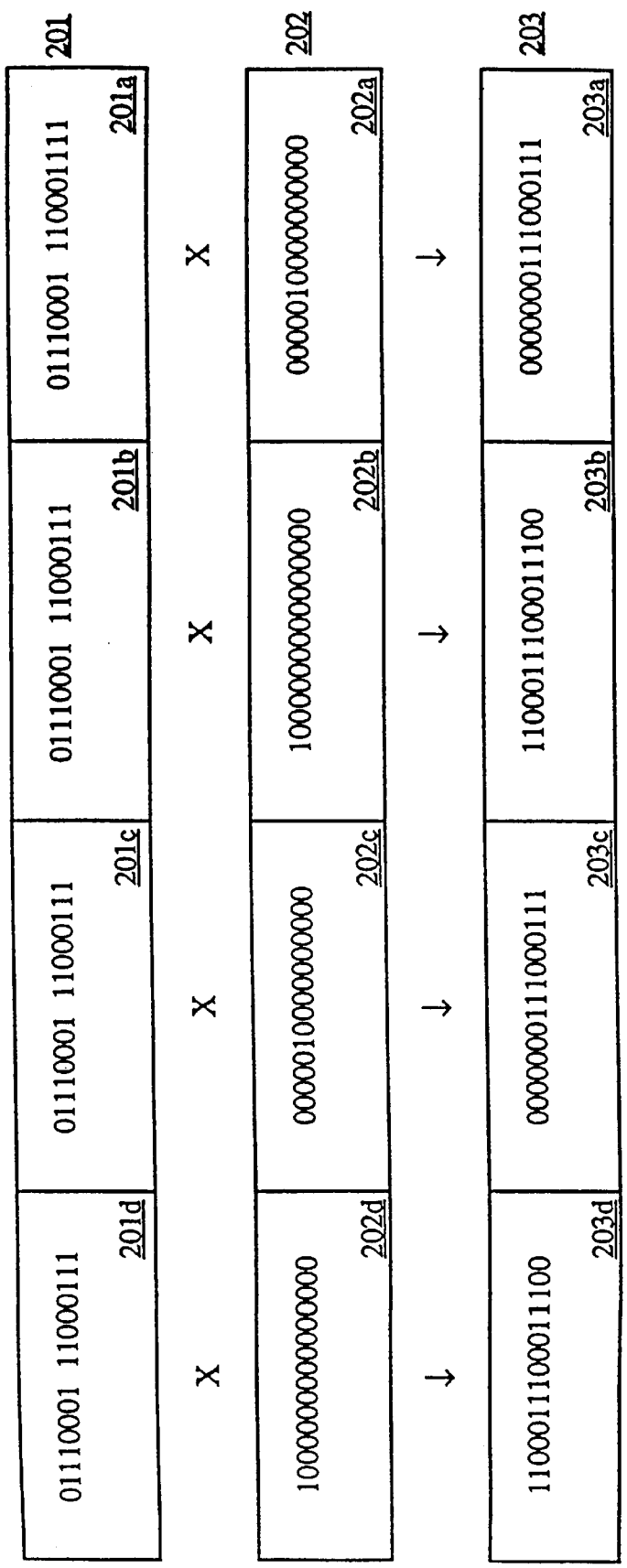
FIG. 2 illustrates the Packed Multiply High operation used in one embodiment in the method of the present invention.
Figure 3:
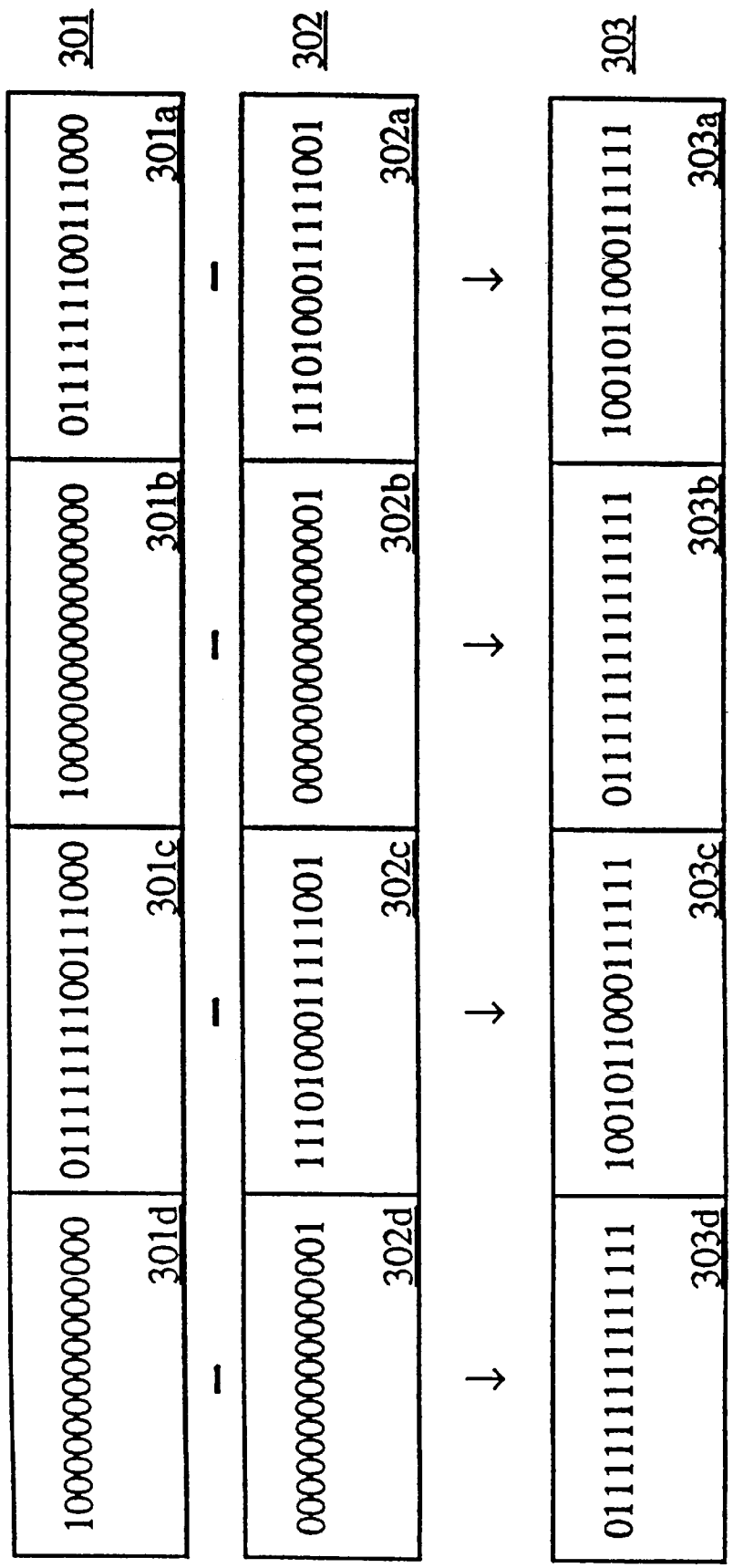
FIG. 3 illustrates the Packed Subtraction operation used in one embodiment in the method of the present invention.
Figure 4:
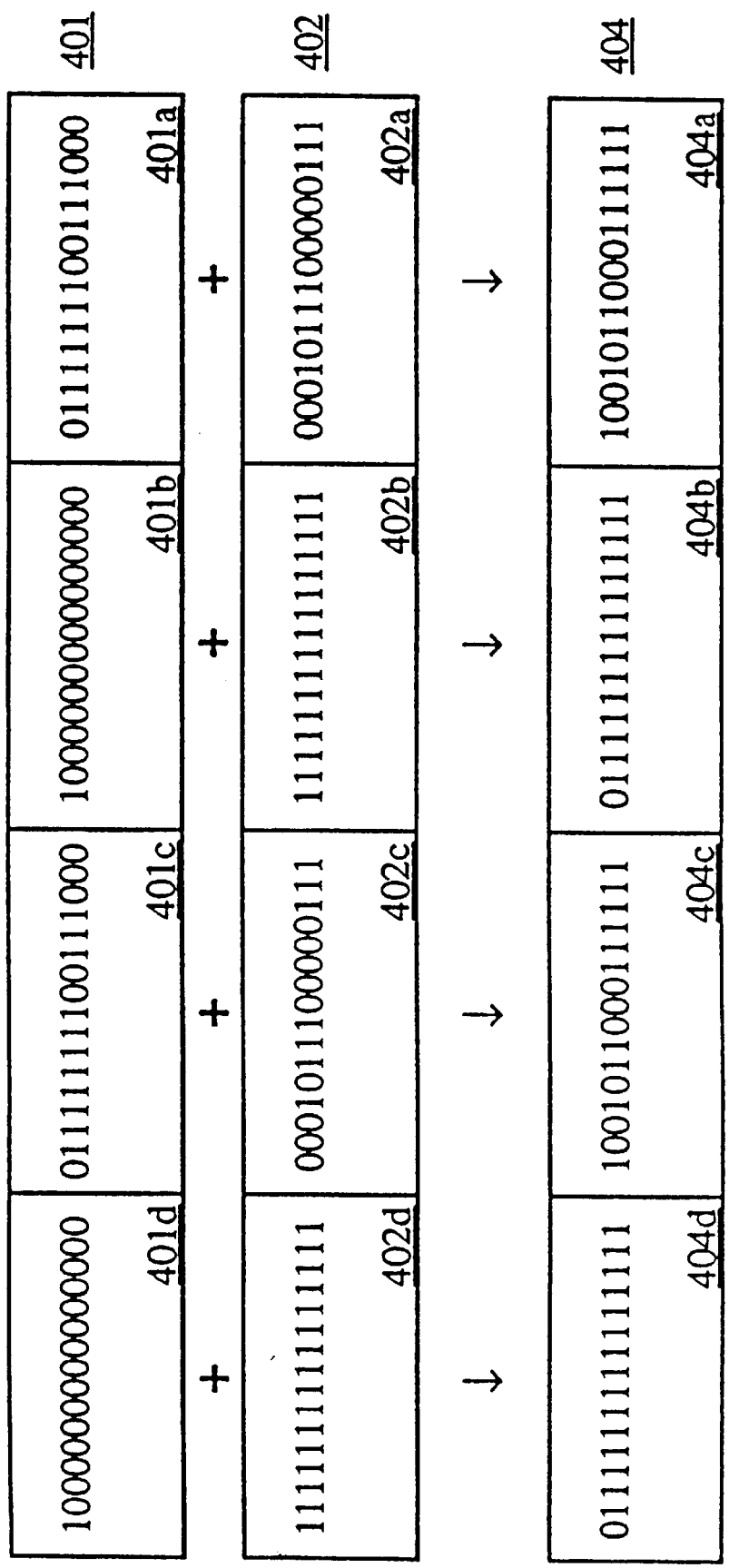
FIG. 4 illustrates the Packed Addition operation used in one embodiment in the method of the present invention.

Referring now to FIGS. 2–4, one embodiment of the instructions of packed instruction set 140 is described in more detail. In each example described below, the Source 1, Source 2, and Results are packed data located in multimedia registers 151. Alternate embodiments may access Source 1, Source 2, and/or Result directly from memory 104. In other embodiments, these registers can be stored in a general purpose register file.

FIG. 2 illustrates an example of the Packed Multiply High (PMULH) operation 146. Data element 203a of Result 203 includes the high order sixteen bits of the product of data element 201a of Source 201 and data element 202a of Source 202. Data element 203b of Result 203 includes the high order sixteen bits of the product of data element 201b of Source 201 and data element 202b of Source 202. Other data elements of Result 203 are computed in a similar manner. The low-order bits of the result are ignored. In alternative embodiments, a packed data memory operand may be used as Source 2 to generate Result 203.

FIG. 3 illustrates an example of the Packed subtraction operation 144. Data element 303a of Result 303 is the difference data element 301a of Source 301 and data element 302a of Source 302. Data element 303b of Result 303 is the difference of data element 301b of Source 301 and data element 302b of Source 302.

FIG. 4 illustrates an example of the Packed addition operation 142. Data element 403a of Result 403 is the sum of data element 401a of Source 401 and data element 402a of Source 402. Data element 403b of Result 403 is the sum of data element 401b of Source 401 and data element 402b of Source 402.

Figure 5:
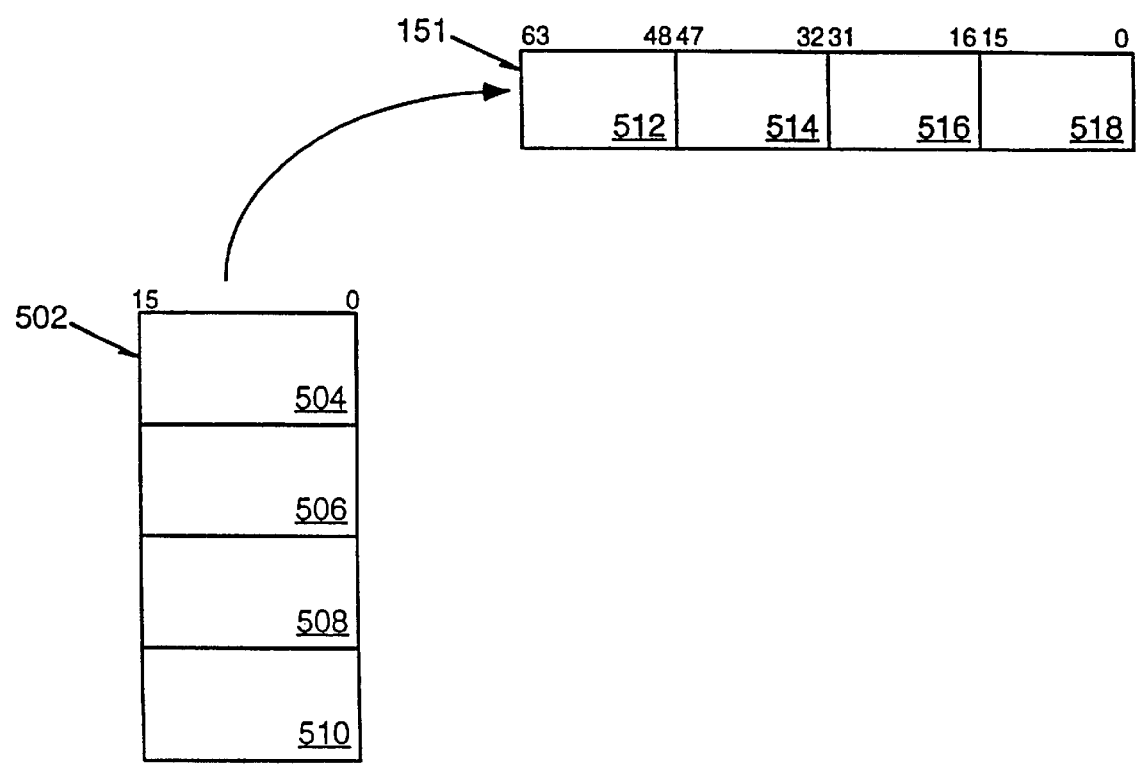
FIG. 5 illustrates the MOVQ operation used in one embodiment in the method of the present invention.

One embodiment of the invention includes a move operation referred to as MOVQ 148, which is used to transfer sixty-four data bits, four packed words, to and from the multimedia registers 151. FIG. 5 illustrates an example of the MOVQ operation. Packed data 502, having packed words 504, 506, 508 and 510 located in memory are transferred to a register of multimedia registers 151, and stored as data elements 512, 514, 516 and 518, respectively.

METHOD OF GENERATING TWO-DIMENSIONAL ROTATION

As previously mentioned, the invention relates to a novel and accelerated method of generating a two-dimensional rotation of data values typically used in multimedia algorithms to process data values. In particular, the invention involves a unique method of using data values in packed data format, and unique packed data instructions to provide a faster and more efficient method of generating the two-dimensional rotation of the data values through the use of fewer instructions compared to alternative methods.

Figure 6:
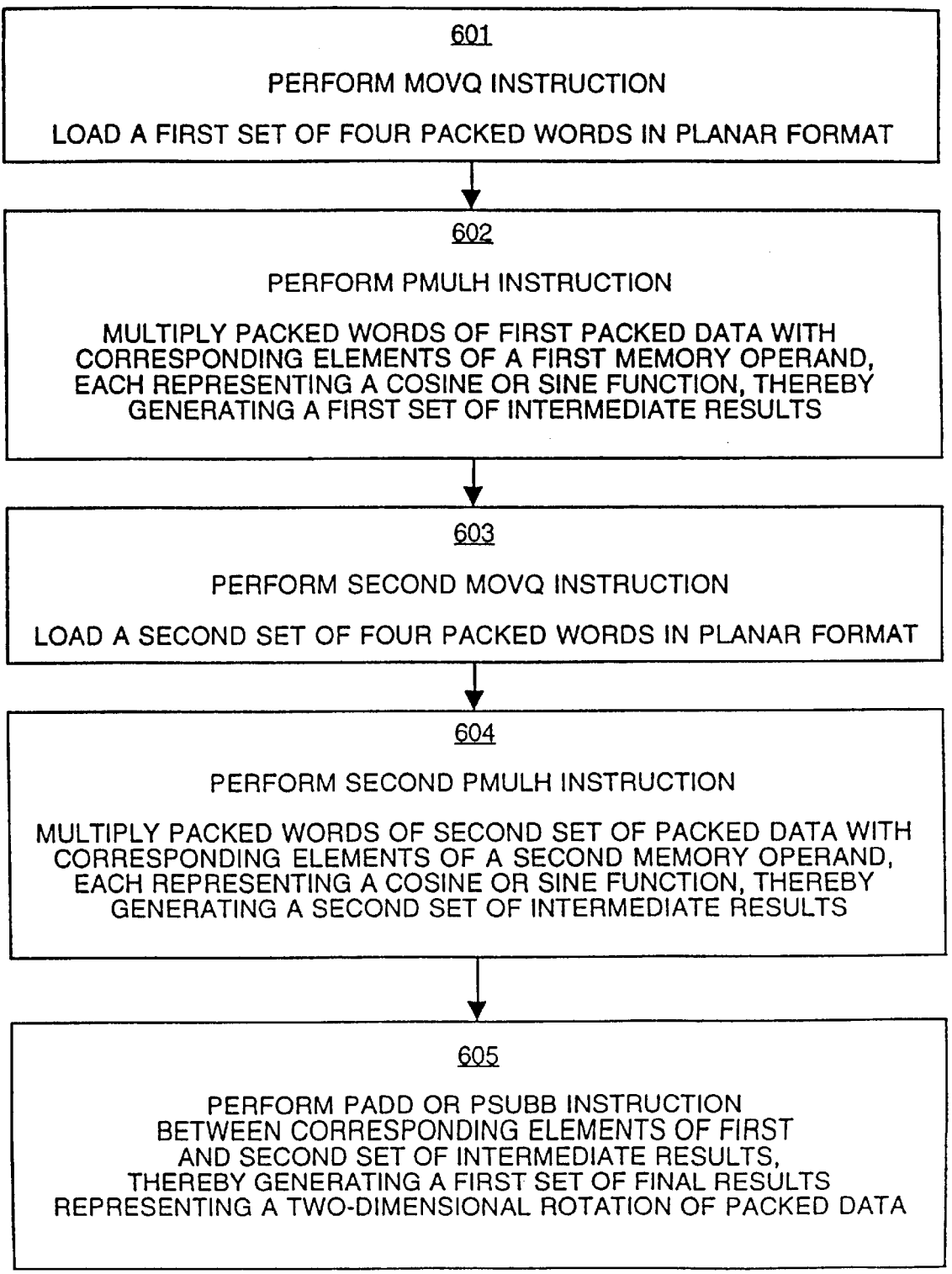
FIG. 6 illustrates a block diagram of the steps used in the method of the present invention.

The specific steps included in one embodiment of the invention are illustrated in FIG. 7 and the block diagram of FIG. 6. In step 601, the MOVQ 148 instruction is used to transfer four data values representing an audio signal or a video image from a storage such as memory 104 as a first packed data 702 having four packed words 702a–702d. The packed words are loaded into a first register of the multimedia registers 151. The packed words are loaded in a planar format, wherein each packed word is assumed to represent a separate position on one axis of a two-dimensional graph, such as the X-axis. The use of the MOVQ 148 instruction provides the advantage of loading four packed words with one instruction, thereby eliminating a need to duplicate the loaded data values or perform additional load operations.

In step 602, a PMULH 146 instruction is issued multiplying the packed words 702a–702d of the first packed data with the corresponding elements 704a–704d of a memory operand stored as a packed data. The elements of the memory operand 704a–704d each represent a cosine or sine function, depending upon the desired final result, in accordance with the equations set forth in table 1. For example, if the method is being implemented to generate a modified X component and the first packed words 702a–702d in the first register are assumed to represent positions along the X axis, then the first memory operand 704 includes elements representing cosine functions.

The PMULH 146 takes advantage of the inherent sixteen-bit fractional data generated by the multiplication with the cosine or sine function. As previously explained, the PMULH 146 only retains the high order sixteen bits of the resultant product, and disregards the lower order bits, which are not critical in the present invention which sacrifices accuracy to obtain a greater processing speed. As such, the single instruction, PMULH 146 provides a first set of four intermediate results 706a–706d as packed words, thereby eliminating the need for additional instructions to shift or truncate the intermediate results to provide the intermediate results in sixteen bit formats. The results are stored in a register of the multimedia registers of 151, as a packed data sequence.

In step 603, step 601 is repeated wherein a second MOVQ instruction is issued to transfer a second packed data sequence 708. The second packed data sequence also includes four packed words 708a–708d that are again loaded in a planar format, wherein each packed word is assumed to represent a separate position on a second axis, such as the Y-axis.

In step 604, step 602 is repeated wherein a second PMULH 146 instruction is issued multiplying packed words 708a–708d of the second packed data sequence 708 with the corresponding elements of a memory operand stored as a packed data sequence. Once again, the elements 710a–710d of the memory operand each represent a cosine or sine function depending upon the desired final result, in accordance with the equations set forth in table 1. The results are stored as a packed data sequence 712 in one of the multimedia registers 151, thereby representing a second set of intermediate results.

In step 605, a fifth instruction providing the final operation for the equations set forth in Table 1, either a PSUB 144 or a PADD 142, is issued to perform an arithmetic operation between the corresponding elements of the first and second set of intermediate results 714a–714d. As a result, in one embodiment, a first set of four final results presented as packed words 716a–716d, each representing a two-dimensional rotation of the first packed data 702, are generated through the use of only five instructions.

In the same embodiment, to provide the modified position and values of the second packed data 708, similar steps would be implemented. Specifically, the original values of the first and second packed data 702 & 708 would be retained. A third PMULH 146 instruction would be issued to multiply elements of the first packed data 702 and corresponding elements of the second memory operand 710, thereby generating a third set of intermediate results. A fourth PMULH 146 would also be issued to multiply elements of the second packed data 708 and corresponding elements of the first memory operand 704, thereby generating a fourth set of intermediate results. A final instruction, either a PSUB 142 or PADD 144, would also be issued to perform an arithmetic operation between corresponding elements of the third and fourth set of intermediate results, thereby generating a second set of final results representing a two-dimensional rotation of the elements 708a–708d of the second packed data 708.

FIGS. 8A and 8B show an application of two-dimensional rotation in accordance with an embodiment of the present invention in which a multimedia is manipulated by, for example, compressing the signal before storing, displaying, or transmitting its associated data. In other embodiments of the present invention, the two-dimensional rotation sequence can be used on a computer system manipulate the multimedia data by performing decompression, filtering, or image edge processing and detection.

In FIG. 8A, the camera 800 transmits a moving-picture video signal to a receiving stage 800 within a first computer system 820 to which the camera is coupled. For an embodiment in which the present invention is implemented in conjunction with a video conferencing application, the image received at receiving stage 802 is primarily an image of the operator of the first computer system 820 in communication with an operator of a remote second computer system 821. For an alternate embodiment in which the computer system operator desires to, for example, edit, store, or otherwise manipulate motion-picture or still-motion video, the output of a VCR, other video capture unit, another computer system, a CD-ROM, or other laser disk is fed to the receiving stage of the computer system.

Coupled to the video camera, or another multimedia input device such as a microphone, could be a digitizing unit which is in turn coupled to the bus of the computer. The multimedia input device receives an audio or image input, and the digitizing unit generates digital data representing the input. Thus, the digitizing unit includes, at least, an analog to digital converter located in the multimedia input device, an I/O expansion card, or hardwired on to the motherboard. Additionally, the digitizing unit could include filtering, data compression, data encryption, or other related steps to manipulate the data representing the images. These steps could be performed by hardware or software within the multimedia input device, and/or software executing on the processor.

At receiving stage 802, the data associated with the video signal is stored into computer system memory. This stored data represents, for example, digital samples of the video signal transmitted by the camera. For one embodiment, the data is organized such that each of a plurality of registers within the computer system memory contains a packed data set wherein each data element of the packed data set represents an associated pixel of a frame of the video image. For example, for one embodiment a 64 bit register contains 8 packed bytes, each byte being associated with a different pixel, wherein the value of each byte represents one of 256 possible colors of its associated pixel. A larger palette of colors may be used in an embodiment in which the 64 bit register contains 4 words, or a 128 bit register contains 8 words, each word being associated with a different pixel.

For one embodiment, two or more separate data elements are used to define an individual pixel. For example, in a red-green-blue (RGB) encoding scheme, one data element in a first packed data set defines the R value of a pixel; another data element in a second packed data set defines the G value of the same pixel; and a third data element in a third packed data set defines the B value of the same pixel. For an embodiment in which the Joint Photographers Expert Group (MPEG) standard or the Moving Pictures Experts Group (MPEG) standard is implemented, the encoding scheme separates the luminance of a pixel from the chrominance of that pixel, storing the data elements representing each of these in separate packed data sets. The luminance of a pixel represents the gray scale, or brightness, of the pixel while the chrominance represents the color of the pixel.

The human eye is more tolerant to errors in color than errors in brightness. By separating the data elements which represent pixel luminance from the data elements which represent pixel chrominance, the data elements representing luminance can be made larger than the data elements representing pixel chrominance, thereby ensuring higher precision of brightness for each pixel while economizing on the space used to store color information. For example, for one embodiment, the length of data elements used to represent luminance is twice the length of data elements used to represent chrominance. Another advantage to separately storing luminance and chrominance data elements is that different compression algorithms can be used to compress the luminance and chrominance data, optimizing each algorithm for the type of data to be compressed.

Note that in accordance with one embodiment of the present invention, digital sampling of the video signal is performed. Sampling of the video signal may be performed by an analog to digital converter either within receiving stage 802 or within camera 800. In the same manner, reconverting a sampled signal back into an analog signal may be performed by a digital to analog converter. Analog to digital and digital to analog converters can be implemented by dedicated hardware, such as digital signal processors. However, in order to avoid unnecessarily obscuring the present invention, waveform sampling is not described in detail here, and in the interest of clarity, all signals are illustrated in FIG. 8B as continuous waveforms.

Once the video signal has been stored as data in the computer system memory, the data is manipulated at compression stage 803, which may include compressing the data into a smaller memory space. In addition, in other embodiments of the present invention, the two-dimensional rotation sequence, at this stage, can be used on a computer system manipulate the multimedia data by performing decompression, filtering, or image edge processing and detection. Nevertheless, in FIG. 8, at stage 803, by occupying a smaller memory space, the video signal is more easily modified, stored, or transmitted because there is less data to modify, store, or transmit, requiring less processing power and system resources. As shown in FIG. 8B, the video signal 812, stored in memory registers of the computer system, is directed to compression stage 803. In the spatial domain, video signal 812 is represented by a waveform in which the amplitude of the signal is indicated by vertical displacement while time or space is indicated by horizontal displacement.

For many compression methods it is desirable to transform a signal from the spatial domain to another domain, such as the frequency domain, before analyzing or modifying the signal. After video signal 812 is received at compression stage 803, the signal is transformed from the spatial domain to the frequency domain. In the frequency domain, the amplitude of a particular frequency component (e.g. a sine or cosine wave) of the original signal is indicated by vertical displacement while the frequency of each frequency component of the original signal is indicated by horizontal displacement. The video waveform 812 is illustrated in the frequency domain at step 813 within compression stage 803.

In one embodiment, transformation of a signal from the spatial to the frequency domain involves performing a two-dimensional rotation of the data elements representing the signal. For example, in accordance with some JPEG and MPEG standards, square subregions of the video image, generally an 8×8 array of pixels, are transformed from the spatial domain to the frequency domain using a discrete cosine transform function. This 8×8 array of pixels corresponds to eight memory registers, each containing packed data sets of eight data elements, each data element corresponding to the value (e.g. color, brightness, etc.) of its associated pixel in the 8×8 array. To efficiently transform this array of data using the discrete cosine transform function, sets of pairs of pixel valves stored in the arrays undergo a two-dimensional rotation technique during a butterfly procedure of the discrete cosine transform function as described above. For another embodiment, other transform functions are implemented such as, for example, a Fourier transform, a fast Fourier transform, a fast Hartley transform, or a wavelet transform.

Once transformed into the frequency domain, individual frequency components of the signal can be selectively analyzed, attenuated, amplified, or discarded. Filtering is a technique in which certain frequency components of a signal are modified. By selecting an appropriate filter function which discards certain frequency components without significantly degrading the appearance of the video image, the video signal is thereby compressed because there are fewer frequency components which define the video image. Filtering of frequency components of the video signal in this manner is implemented at step 814 within compression stage 803.

Each frequency component of the waveform is multiplied by an associated coefficient of a low-pass filter function, or, where the associated coefficient is 0, the frequency component is simply not calculated as part of the transform function. As illustrated in FIG. 8B, a low-pass filter eliminates or attenuates higher frequency components of the waveform, allowing lower frequency components to pass through. Higher frequency components are frequencies above a predetermined limit (referred to as the "cutoff frequency" in some applications), while lower frequency components are frequencies below this predetermined limit.

Note that frequency components of a waveform can be manipulated in the frequency domain using other techniques in accordance with other embodiments of the present invention. For one embodiment, an audio waveform transmitted by microphone 801 is analyzed and manipulated in a similar manner by computer system 820. For example, upper harmonic analyses of audio waveforms in the frequency domain are conducted in accordance with voice recognition applications. As another example, the harmonic spectrum of audio waveforms are modulated over time to imitate the sounds of voices, sound effects, or musical instruments. In conjunction with sound transmission or storage applications, the audio waveform is compressed by filtering techniques.

Video images can be similarly manipulated in the frequency domain to do more than merely compress the video data. For example, for one embodiment of the present invention, a high-pass filter is applied to a video signal in an edge detection technique. A high-pass filter eliminates or attenuates lower frequency components of the signal, allowing higher frequency components to pass through. Because sharp, high-contrast edges of a video image generally correspond to high frequency components of the associated video signal, a high-pass filter will isolate these edges. This technique may be found useful in motion and image detection and recognition applications. Also, this technique may be found to have applications in predictive vector quantization compression in which the motion of boundaries in consecutive frames of a moving-picture video signal are tracked and predicted to generate successive images.

For one embodiment of the present invention, after the video signal is filtered, the signal is reconverted back into the spatial domain by applying an inverse transform to the data. Alternatively, the signal remains in the frequency domain and is transformed back into the spatial domain during the decompression stage, as described below. Removal of these high frequency components from the original video signal does not significantly degrade picture quality. In general, the more a signal is compressed, the greater the loss of image fidelity. Because the human eye is more sensitive to errors in luminance than in chrominance, as stated above, the chrominance portion of the video signal is more highly compressed than the luminance portion.

In addition, in accordance with JPEG, MPEG, and other video compression methods, differing degrees of compression may be applied to different regions of a video image to gain more compression in those regions requiring less image detail, and less compression in those regions requiring more detail. For an embodiment in which image quality is not of the essence, such as, for example, in a video conferencing application, high compression with lower frame rates is appropriate. High compression is appropriate because a user generally need only be able to discern the face of the speaker, without intricate detail. Lower frame rates are appropriate because there is likely to be little movement of objects in the video image. One way of achieving higher compression is to simply narrow the low-pass filter function applied to the video signal, thereby removing more higher frequency components.

Additional compression is achieved by truncating the precision of the data and then using a coding scheme to store repetitious terms in an efficient manner. In accordance with the MPEG standard, additional compression is achieved by matching similar arrays of pixels in successive frames, and encoding only the differences or interpolations between frames. By compressing the video signal in this manner, the signal will occupy a smaller amount of space in memory. After compression, the signal is stored, displayed, and/or transmitted at step 816. For example, in accordance with the embodiment illustrated in FIG. 8A, after the video signal leaves compression stage 803, the signal enters transmission stage 804 which transmits the compressed video signal to the receiving stage 807 of a second computer system 821. Because the video signal is compressed, the bandwidth required to transmit the signal from transmitter 804 to receiver 807 is greatly reduced, permitting, for example, phone lines to be used for the transmission. For one embodiment of the present invention, in addition to transmitting the video signal, the video signal is encrypted at transmission stage 804.

Upon receiving the compressed video signal at receiving stage 807, the data associated with the signal is loaded into computer system memory. In addition, if the video signal is encrypted, it is decrypted here. At decompression stage 808, the signal is decompressed by a method including, for example, applying an inverse transform to the data to translate the signal back into the spatial domain. This assumes the signal has been transmitted in a compressed format in the frequency domain from computer system 820. For an embodiment in which the compressed video signal is transmitted in the spatial domain, application of an inverse transform during the decompression stage may not be necessary. However, decompression of an audio or video signal may be more easily accomplished in the frequency domain, requiring a spatial domain signal received by decompression stage 808 to be transformed into the frequency domain for decompression, then back into the spatial domain for display.

For many embodiments of the present invention in which either transformation, inverse transformation, or both are required for decompression of a video signal, performing the two-dimensional rotation on the sets or pairs of pixel values is an important step for improving the efficiency of the decompression. This rotation is accomplished using one of the array rotation techniques described above.

Once decompressed, the signal is transferred to display stage 809, which may comprise a video RAM (VRAM) array, and the image is displayed on display device 811. Using this technique, a user at computer system 820 can transmit a video image to computer system 821 for viewing at the second computer terminal. In addition, audio information gathered by microphone 801 can be compressed and transmitted by computer system 820 to computer system 821, with playback available from speakers 810. Similarly, computer system 821 may have similar video and audio transmission capabilities (not shown), allowing display and audio playback on display device 806 and speakers 805, respectively, of computer system 820. In this manner, applications such as video conferencing are enabled.

From the above description, it will be apparent that the invention disclosed herein provides a novel, accelerated, and advantageous computer system for performing a two-dimensional rotation of packed data representing multimedia information. As will be understood by those familiar with the art, the invention may be embodied in other specific forms without departing from its essential features, and thus, the described embodiments are not restrictive of the scope of the invention. The following claims are indicative of the scope of the invention, and all variations which come within the meaning and range of equivalency of the claims are to be embraced within their scope.

What is claimed is:

1. A computer system comprising:

a processor;

a multimedia input device receiving an image or audio input;

a memory coupled to said input device and said processor, said memory having stored therein a set of packed data sequences having data elements representing said input, and a compression routine for manipulating said input, which when executed by said processor, causes said processor to perform a two-dimensional rotation on said input by causing said processor to:

generate a first set of intermediate results in response to execution of a single first instruction which multiplies data elements of a first packed data sequence with corresponding elements of a second packed data sequence, the data elements of said second packed data sequence representing either a sine or cosine function;

generate a second set of intermediate results in response to execution of a single second instruction which multiplies the data elements of a third packed data sequence with corresponding data elements of a fourth packed data sequence, the data elements of said fourth packed data sequence representing either a sine or cosine function; and generate a first set of final results in response to execution of a single third instruction which performs an arithmetic operation between corresponding data elements of said first and second sets of intermediate results.

2. The computer system of claim 1 wherein said sequence of instructions further causes said processor to:

generate a third set of intermediate results in response to execution of a fourth instruction which multiplies the data elements of said first packed data sequence with corresponding data elements of said fourth packed data sequence;

generate a fourth set of intermediate results in response to a fifth instruction by multiplying said data elements of said second packed data with corresponding elements of said third packed data;

generate a second set of final results in response to a sixth instruction by performing an arithmetic operation between corresponding elements of said third and fourth sets of intermediate results, wherein said second set of final results representing a two-dimensional rotation of said elements of said second packed data.

3. The computer system of claim 2, wherein said data elements of said first and third packed data represent data values stored in a planar format.

4. The computer system of claim 3, wherein said data elements of said first packed data are stored as representing separate positions along a first axis of a two-dimensional graph.

5. The computer system of claim 4, wherein said data elements of said third packed data are stored as representing separate positions along a second axis of said two-dimensional graph corresponding to said positions of said first packed data.

6. The computer system of claim 5, wherein said the elements of said second and fourth packed data representing either said sine or cosine function have been multiplied by a scale representing a predetermined distance of movement on said graph.

7. The computer system of claim 6, wherein said the elements of the second packed data represent said cosine function, and the elements of said fourth packed data represent said sine function.

8. The computer system of claim 7, wherein the said sequence of instructions are for compressing said digital data representing said input into a Moving Pictures Expert Group (MPEG) standard format.

9. The computer system of claim 8, wherein said multimedia input device is a video camera, an optical storage device, or a microphone.

10. The computer system of claim 9, wherein each data element is associated with a different pixel from a corresponding array of pixels of an image input.

11. A computer system comprising:

a processor;

a multimedia input device receiving an image or audio input;

a memory coupled to said input device and said processor, said memory having stored therein a set of packed data sequences having data elements representing said input, and a decompression routine for manipulating said input, which when executed by said processor, causes said processor to perform a two-dimensional rotation on said input by causing said processor to:

generate a first set of intermediate results in response to execution of a single first instruction which multiples data elements of a first packed data sequence with corresponding elements of a second packed data sequence, the data elements of said second packed data sequence representing either a sine or cosine function;

generate a second set of intermediate results in response to execution of a single second instruction which multiplies the data elements of a third packed data sequence with corresponding data elements of a fourth packed data sequence, the data elements of said fourth packed data sequence representing either a sine or cosine function; and generate a first set of final results in response to execution of a single third instruction which performs an arithmetic operation between corresponding data elements of said first and second sets of intermediate results.

12. The computer system of claim 11 wherein said sequence of instructions further causes said processor to:

generate a third set of intermediate results in response to execution of a fourth instruction which multiplies the data elements of said first packed data sequence with corresponding data elements of said fourth packed data sequence;

generate a fourth set of intermediate results in response to a fifth instruction by multiplying said data elements of said second packed data with corresponding elements of said third packed data;

generate a second set of final results in response to a sixth instruction by performing an arithmetic operation between corresponding elements of said third and fourth sets of intermediate results, wherein said second set of final results representing a two-dimensional rotation of said elements of said second packed data.

13. The computer system of claim 12, wherein said data elements of said first and third packed data represent data values stored in a planar format.

14. The computer system of claim 13, wherein said data elements of said first packed data are stored as representing separate positions along a first axis of a two-dimensional graph.

15. The computer system of claim 14, wherein said data elements of said third packed data are stored as representing separate positions along a second axis of said two-dimensional graph corresponding to said positions of said first packed data.

16. The computer system of claim 15, wherein said the elements of said second and fourth packed data representing either said sine or cosine function have been multiplied by a scale representing a predetermined distance of movement on said graph.

17. The computer system of claim 16, wherein said the elements of the second packed data represent said cosine function, and the elements of said fourth packed data represent said sine function.

18. The computer system of claim 17, wherein the said sequence of instructions are for compressing said digital data representing said input into a Moving Pictures Expert Group (MPEG) standard format.

19. The computer system of claim 18, wherein said multimedia input device is a video camera, an optical storage device, or a microphone.

20. The computer system of claim 19, wherein each data element is associated with a different pixel from a corresponding array of pixels of an image input.

21. A computer system comprising:

a processor;

a multimedia input device receiving an image or audio input;

a memory coupled to said input device and said processor, said memory having stored therein a set of packed data sequences having data elements representing said input, and an image edge processing routine for manipulating said input, which when executed by said processor, causes said processor to perform a two-dimensional rotation on said input by causing said processor to:

generate a first set of intermediate results in response to execution of a single first instruction which multiples data elements of a first packed data sequence with corresponding elements of a second packed data sequence, the data elements of said second packed data sequence representing either a sine or cosine function;

generate a second set of intermediate results in response to execution of a single second instruction which multiplies the data elements of a second packed data sequence with corresponding data elements of a fourth packed data sequence, the data elements of said fourth packed data sequence representing either a sine or cosine function; and generate a first set of final results in response to execution of a single third instruction which performs an arithmetic operation between corresponding data elements of said first and second sets of intermediate results.

22. The computer system of claim 21 wherein said sequence of instructions further causes said processor to:

generate a third set of intermediate results in response to execution of a fourth instruction which multiplies the data elements of said first packed data sequence with corresponding data elements of said fourth packed data sequence;

generate a fourth set of intermediate results in response to a fifth instruction by multiplying said data elements of said second packed data with corresponding elements of said third packed data;

generate a second set of final results in response to a sixth instruction by performing an arithmetic operation between corresponding elements of said third and fourth sets of intermediate results, wherein said second set of final results representing a two-dimensional rotation of said elements of said second packed data.

23. The computer system of claim 22, wherein said data elements of said first and third packed data represent data values stored in a planar format.

24. The computer system of claim 23, wherein said data elements of said first packed data are stored as representing separate positions along a first axis of a two-dimensional graph.

25. The computer system of claim 24, wherein said data elements of said third packed data are stored as representing separate positions along a second axis of said two-dimensional graph corresponding to said positions of said first packed data.

26. The computer system of claim 25, wherein said the elements of said second and fourth packed data representing either said sine or cosine function have been multiplied by a scale representing a predetermined distance of movement on said graph.

27. The computer system of claim 26, wherein said the elements of the second packed data represent said cosine function, and the elements of said fourth packed data represent said sine function.

28. The computer system of claim 27, wherein the said sequence of instructions are for compressing said digital data representing said input into a Moving Pictures Expert Group (MPEG) standard format.

29. The computer system of claim 28, wherein said multimedia input device is a video camera, an optical storage device, or a microphone.

30. The computer system of claim 29, wherein each data element is associated with a different pixel from a corresponding array of pixels of an image input.

* * * * *